May 10, 1955     C. H. SOLLMANN     2,707,957
TENACULUM HOLDER FOR UTERINE CANNULA
Filed Sept. 30, 1952
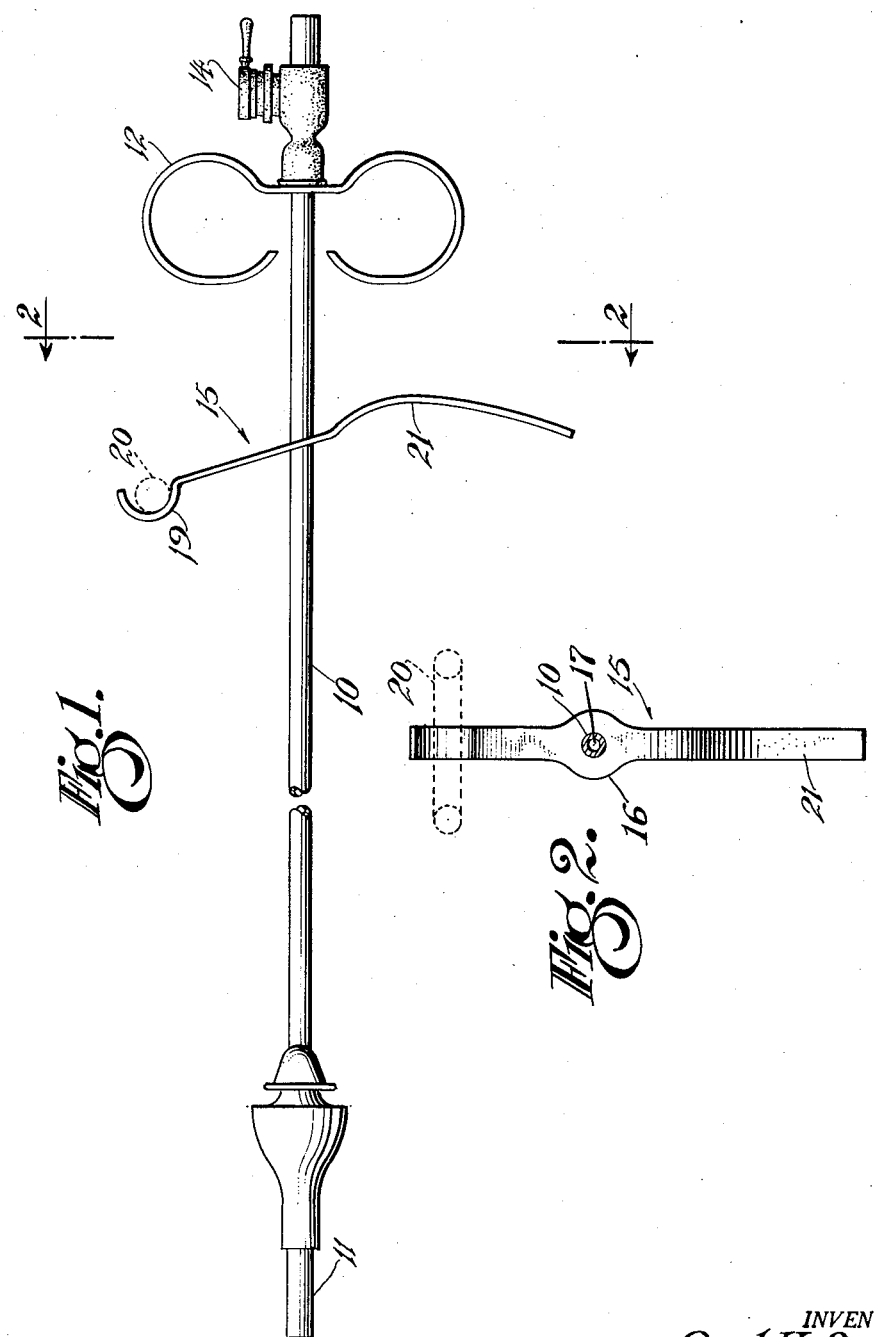
INVENTOR.
*Carl H. Sollmann*
BY
*Ernest A. Joenen*
ATTORNEY

United States Patent Office 2,707,957
Patented May 10, 1955

2,707,957

TENACULUM HOLDER FOR UTERINE CANNULA

Carl H. Sollmann, Far Hills, N. J., assignor to Kidde Manufacturing Co., Inc., Bloomfield, N. J., a corporation of Delaware Application September 30, 1952, Serial No. 312,216

10 Claims. (Cl. 128—348)

The present invention relates to cannulas, and, more particularly, to an improved tenaculum holder for uterine cannulas and the like.

Heretofore, tenaculum holders for uterine cannulas have been constructed of rod or bar stock or in the form of a casting comprising a bearing for rotatably and slidably receiving the shaft of the cannula, a tenaculum supporting element, a finger grip and a thumb screw for securing the holder to the shaft. Such holders were bulky in construction, and appreciably increased the weight of the instrument whereby its use tired the operator's hand. Also, the holder required the use of both hands of the operator to adjust the same which made manipulation of the instrument cumbersome and tedious.

Accordingly, an object of the present invention is to provide a uterine cannula tenaculum holder which overcomes the foregoing difficulties and objections.

Another object is to provide such a holder which is extremely simple and economical in construction.

Another object is to provide such a holder which can be adjusted by using only one hand thus facilitating manipulation of the instrument.

A further object is to provide such a holder formed of a single element which is extremely light in weight and thereby greatly decreases the overall weight of the instrument.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a tenaculum holder comprising tenaculum supporting means, manually engageable means such as a finger grip, and an opening between these means for receiving a cylindrical section of the cannula shaft in close fitting relation but with sufficient clearance to facilitate rotating the holder about the axis of the shaft, tilting the holder with respect to the axis and sliding the holder along the shaft, whereby the holder is freely movable on the shaft to adjust the position thereof lengthwise and rotatively and whereby the holder is adapted to be retained in such adjusted positions by friction between contacting surfaces of the shaft and the holder when the holder is tilted and forces are exerted thereon by the tenaculum in being supported.

A preferred embodiment of the invention has been chosen for purposes of illustration and description, and is shown in the accompanying drawing, forming a part of the specification, wherein:

Fig. 1 is a side elevational view of a uterine cannula equipped with a tenaculum holder in accordance with the present invention, a portion of the cannula shaft being broken away, and illustrating the holder in its operative position with a portion of a tenaculum being supported thereon shown in broken lines.

Fig. 2 is a sectional view taken along the line 2—2 on Fig. 1.

Referring to the drawing in detail there is shown a uterine cannula generally comprising a tubular shaft 10, a tip 11 at one end of the shaft, a handle or grip 12 adjacent the other end of the shaft, a stopcock 14 adjacent the handle for controlling the flow of fluid through the shaft, and a tenaculum holder 15, in accordance with the invention, mounted on the shaft for rotatable and slidable movement in the manner about to be described.

The shaft 10 preferably is a cylindrical metal tube throughout its length or at least has a cylindrical section at the portion thereof where the tenaculum holder 15 is mounted.

The tenaculum holder 15 is constructed of a thin unitary strip of flat metal of relatively narrow width throughout its length but having a portion 16 of greater width between its ends in which is formed an aperture 17 (Fig. 2). The aperture preferably is circular and of a size to receive the cylindrical shaft section in close fitting relation but with ufficient clearance to facilitate rotating, sliding and tilting the holder with respect to the shaft. For example, the aperture 17 has a diameter about one to five thousandths of an inch greater than the diameter of the shaft section. If desired, the aperture may be square or of any other polygonal shape with the sides contacting the shaft providing the desired clearance.

At one side of the aperture 17, the holder is formed with a hook-like element 19 at the end thereof serving as means for receiving a portion 20 of a tenaculum herein shown schematically in broken lines. This element, as shown, has an arcuate or semicircular contour with the concave side thereof facing the handle end of the cannula.

At the other side of the aperture 17, the holder is formed with an arcuate element 21 of a sweeping curvature having its concave side facing the tip end of the cannula to provide means serving as a finger grip or trigger adapted to be manipulated by a finger of the handle grasping the handle 12 to rotatably or slidably adjust the position of the holder on the shaft. Preferably, the side forming the element 21 is longer than the side forming the element 19 to provide suitable leverage.

In operation, when the holder 15 is moved into its adjusted position, a pull is exerted on the tenaculum causing the upper end of the holder (as viewed) to be tilted slightly towards the tip end of the cannula, whereby the holder is retained in such adjusted position by friction between contacting surfaces of the shaft and the holder.

From the foregoing description, it will be seen that the present invention provides a tenaculum holder which is so simple that it can be stamped from a sheet of strip of material in a single operation whereby the cost thereof is reduced to a minimum. The weight of the holder by reason of such construction is negligible and provides for an instrument having less overall weight. The manipulation of the holder can be accomplished with a single finger in an expeditious manner and thus greatly aids the operator in the use of the instrument. The holder in accordance with the invention is a highly practical improvement in the respect that the holder can be applied to newly manufactured cannulas or to existing cannulas already in use.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A cannula of the class described comprising a shaft having a cylindrical section; and a tenaculum holder having means for supporting a tenaculum, having manually engageable means and having an opening between said means through which said cylindrical section extends in close fitting relation but with sufficient clearance to facilitate rotating said holder about the longitudinal axis of said section and tilting said holder with respect to said axis and sliding said holder along said section, whereby said holder is freely movable on said section to adjust the position thereof and said holder is adapted to be retained in such adjusted position by friction between contacting surfaces of said section and said holder when said holder is tilted and forces are exerted on said holder by the tenaculum supported by said means.

2. A cannula according to claim 1, wherein said opening is generally circular and has a diameter several thousandths of an inch greater than that of said section.

3. A cannula according to claim 1, wherein said holder is in the form of a flat elongate strip.

4. A cannula according to claim 3, wherein said strip has one side curved in one direction to provide said tenaculum supporting means and has the other side curved in the opposite direction to provide said manually engageable means.

5. A cannula according to claim 4, wherein said first mentioned side of said strip is substantially semicircular at the free end thereof and said second mentioned side is generally arcuate along the length thereof.

6. A cannula according to claim 5, wherein said arcuate side of said holder is longer than the other side of said holder.

7. In combination, a cannula having a shaft, and a tenaculum holder comprising a flat strip of material having an aperture therein through which the shaft of the cannula extends, having tenaculum supporting means at one side of said aperture, and having manually engageable means at the other side of said aperture.

8. Structure in accordance with claim 7, wherein said tenaculum supporting means is hook-shaped.

9. Structure in accordance with claim 7, wherein said manually engageable means is arcuate in contour to provide a trigger-like element.

10. Structure in accordance with claim 7, wherein the side of said strip formed with said manually engageable means is longer than the side of said strip formed with said tenaculum supporting means.

References Cited in the file of this patent

UNITED STATES PATENTS

| | | |
|---|---|---|
| 280,639 | Lipe | July 3, 1883 |
| 1,912,820 | Brown | June 6, 1933 |
| 2,482,622 | Kahn | Sept. 20, 1949 |